United States Patent [19]
Usui et al.

[11] 3,774,714
[45] Nov. 27, 1973

[54] MOTOR VEHICLE SAFETY DEVICE

[75] Inventors: Keizaburo Usui, Yokohama City;
Takashi Haruna, Yokosuka City,
both of Japan

[73] Assignee: Nissan Motor Company Limited,
Yokohama City, Japan

[22] Filed: Oct. 1, 1971

[21] Appl. No.: 185,538

[52] U.S. Cl............ 180/91, 180/103, 280/150 AB,
340/61
[51] Int. Cl............................................ B60r 21/08
[58] Field of Search .................. 180/91, 92, 93, 94,
180/95, 96, 97, 103; 280/150 AB; 340/61;
102/70.2 R, 71, 75, 82

[56] References Cited
UNITED STATES PATENTS

| | | | |
|---|---|---|---|
| 3,684,309 | 8/1972 | Uchiyamada................ | 280/150 AB |
| 3,552,769 | 1/1971 | Kemmerer et al............. | 180/91 X |
| 3,495,675 | 2/1970 | Hass et al. ............................ | 180/91 |
| 3,663,035 | 5/1972 | Norton......................... | 280/150 AB |
| 3,269,783 | 8/1966 | Krlz................................... | 180/92 X |
| 3,420,572 | 1/1969 | Bisland .......................... | 180/103 X |
| 2,625,594 | 1/1953 | Mathis.............................. | 180/82 X |

*Primary Examiner*—Kenneth H. Betts
*Assistant Examiner*—John P. Silverstrim
*Attorney*—Donal E. McCarthy et al.

[57] ABSTRACT

A collision impact sensor and initiator circuit in which a front switch, made of two ribbon like contacts, is mounted on a car bumper from end to end and a similarly constructed rear or initiator switch is mounted behind the bumper on the car body. When a collision occurs at a low vehicle speed the front switch is closed feeding current into a delaying capacitor for preventing the initiator switch from causing actuation even if the initiator switch is closed in the collision after a preselected time interval, but in a collision at a high vehicle speed the bumper collapses and closes the initiator switch in a shorter time than the preselected interval and actuation of the safety device takes place.

3 Claims, 4 Drawing Figures

PATENTED NOV 27 1973 3,774,714
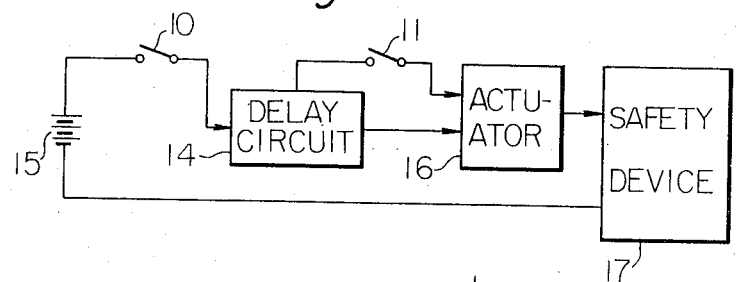
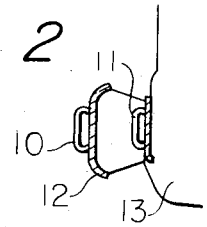
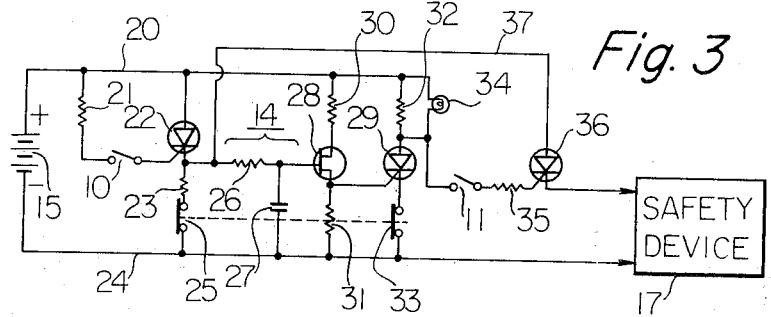
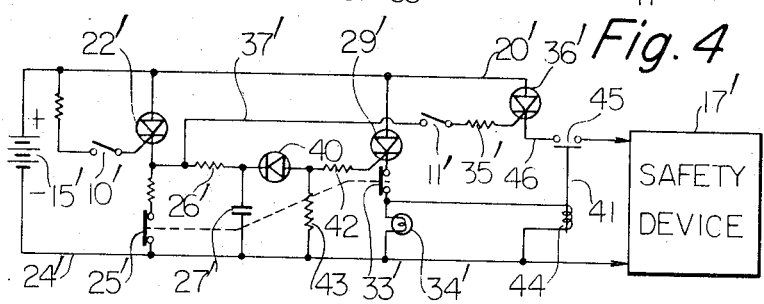

MOTOR VEHICLE SAFETY DEVICE

This invention relates generally to motor vehicle safety devices, and more particularly to an improved impact sensor that is capable of sensing a sudden impact caused by a collision for activating such safety devices.

Heretofore, many safety devices have been proposed for use on motor vehicles. In certain of them, a netting or an air bag is provided which is normally stored in a folded condition and is automatically triggered to a protective position at the time of a collision, thereby preventing injuries including whip-lash injuries to the vehicle occupants. Such triggering of the safety device is usually effected by a mechanical type impact sensor designed to be responsive only to deceleration or acceleration rate of more than a given magnitude resulting from a collision. However, the impact sensor of this type is disadvantageous in that, with deceleration rate below the given magnitude, even if the vehicle speed at the time of a collision is so high as to possibly cause critical physical injuries to the occupants, the impact sensor fails to initiate the safety device into action. Such cases arise, for example, when a collision takes place between the motor vehicle and a soft and shock absorptive structure or when a large-sized motor vehicle having a safety device thereon is in collision with a small-sized one.

It is therefore an object of this invention to provide an improved impact sensor for use with motor vehicle safety devices with a view to overcome the above-stated disadvantages.

It is another object of this invention to provide an improved impact sensor that is capable of triggering motor vehicle safety devices in response to the speed of the vehicle at the moment of a collision exceeding a predetermined magnitude.

It is a further object of this invention to provide an improved impact sensor to be used with the conventional mechanical type impact sensor for enabling the motor vehicle safety devices to be triggered with increased reliability.

In the drawings:

FIG. 1 is a block diagram showing an impact sensor for a motor vehicle safety device according to this invention;

FIG. 2 is a schematic diagram showing the manner in which two impact responsive switches are mounted on the motor vehicle; and FIGS. 3 and 4 are circuit diagrams showing two examples of the impact sensor of FIG. 1.

Referring now to FIG. 1, the impact sensor according to this invention comprises two impact responsive switches 10 and 11 which are adapted to be closed at intervals dependent upon the vehicle speed at the moment of collision. These impact responsive switches 10 and 11 are of the type comprising two ribbon like contacts facing each other and are mounted on the front, rear and/or side portions of the motor vehicle, as desired, with the first impact responsive switch 10 in front of the second or rear impact responsive switch 11. As is exemplified in FIG. 2, the impact responsive switch 10 is secured on the outer surface of a bumper 12 so as to extend along the same, while the other impact responsive switch 11 is fixed on the surface of the vehicle body 13 facing the inner surface of the bumper 12 so that deformation of the bumper 12 caused by a collision of the motor vehicle automatically closes the switch 11.

The impact sensor also includes a delay circuit 14 connected to one contact of the impact responsive switch 10, the other contact thereof being connected to a battery 15 or other source d.c. voltage. The delay circuit 14 functions to delay an "ON" signal from the impact responsive switch 10 for a fixed time and is connected at its output to one input of an actuator 16. It is to be noted, in this connection, that the "ON" signal thus delayed is applied to the actuator 16 to render it inoperative.

The other impact responsive switch 11 is connected at one end to the delay circuit 14 and at the other to the other input of the actuator 16, so that an "ON" signal is supplied to the actuator 16 only when switch 11 is closed after closure of the impact responsive switch 10. The output of the actuator 16 is connected to a motor vehicle safety device 17 of any conventional type, for example, a netting or an air bag (not shown) which is automatically positioned in a protective position in the event of a collision, so as to prevent injuries including whip-lash injuries to the vehicle occupants. The actuator 16, upon receipt of the "ON" signal from the other impact responsive switch 11, operates to activate the motor vehicle safety device 17.

In the event of a collision, the impact responsive switch 10 is first closed by another vehicle or a structure, supplying an "ON" signal to the delay circuit 14. With the "ON" signal received by the delay circuit 14, it will be appreciated that the actuator 16 is placed in a condition in which it waits for closure of the other impact responsive switch 11 to activate the motor vehicle safety device 17. As described above, the "ON" signal from the impact responsive switch 10 is delayed for a fixed time by the delay circuit 14 and is supplied to the actuator 16 to render it inoperative. Thus, it will be understood that the motor vehicle safety device 17 is activated at the time when the other impact responsive switch 11 is closed before the actuator 16 is rendered inoperative, that is, at a time earlier than a fixed time after the impact responsive switch 10 is closed. If the other impact responsive switch 11 is closed at a time later than a fixed time after closure of the impact responsive switch 10, the safety device 17 is not triggered. Assuming that the mechanical strength of bumper supporting or other collapsable support members (not shown) is negligibly small as compared to the energy of inertia carried by the vehicle weight, the fixed time $t$ associated with the delay circuit 14 is determined from the following expression:

$$t = l/V$$

where $l$ represents the distance between the two impact responsive switches 10 and 11 and $V$ indicates that maximum speed of the vehicle at the moment of collision below which it is not desired for the safety device 17 to be activated. As an example, if $l$ and $V$ equal 50 mm and 10 km per hour, respectively, $t$ is 18 ms.

In FIG. 3, there is shown preferred embodiment of the impact sensor according to this invention.

The impact responsive switch 10 is connected at one terminal to a bus line 20 of positive voltage through a resistor 21, the bus line 20 leading to the battery 15. The other terminal of the impact responsive switch 10 is connected to the gate of a thyristor 22. The thyristor 22 has its anode connected to the bus line 20 and its cathode connected to a resistor 23 which in turn is connected to a ground line 24 through a push button switch 25. The cathode is also connected to the delay circuit 14 comprising a resistor 26 and a grounded capacitor 27 and a point between them is connected to the emitter of a unijunction transistor 28 serving as a trigger generator for another thyristor 29. The unijunction transistor 28 has one base connected to the bus line 20 through a resistor 30 and the other connected to the ground line 24 through a resistor 31. The other base of the unijunction transistor 28 is also connected to the gate of the thyristor 29 the anode of which is connected to the bus line 20 through a resistor 32. The cathode of the thyristor 29 is connected to a push button switch 33 which is ganged with the push button switch 25. These push button switches 25 and 33 serve to reset the present impact sensor.

The other impact responsive switch 11 is connected at one terminal to the anode of the thyristor 29 and also to a pilot lamp 34 leading to the bus line 20. The other terminal of the impact responsive switch 11 is connected through a resistor 35 to the gate of a thyristor 36. The anode of the thyristor 36 is connected through a line 37 to the cathode of the thyristor 22. The thyristor 36 has its cathode connected to the motor vehicle safety device 17.

In the operation of the circuit shown in FIG. 3, when the impact responsive switch 10 is closed by another vehicle or an obstruction in the path of vehicle advance, the thyristor 22 is rendered conductive, supplying a positive voltage to the thyristor 36. Thus, under this condition, if the other impact responsive switch 11 is closed due to deformation of the bumper 12, the thyristor 36 is rendered conductive so that the motor vehicle safety device 17 is initiated into action.

With the impact responsive switch 10 closed positive voltage is supplied also to the delay circuit 14 and the capacitor 27 starts charging. A fixed time after closure of the impact responsive switch 10, the voltage across the capacitor 27 rises to such a level as to render the unijunction transistor 28 conductive. The time required to charge the capacitor 27 to such a level can be varied by changing the resistance value of the resistor 26. Conduction of the unijunction transistor 28 causes conduction of the thyristor 29, so that the voltage at the anode thereof drops to approximately zero and simultaneously the pilot lamp 34 is lighted. When this occurs, closure of the other impact responsive switch 11 does not bring about conduction of the thyristor 36. Thus, if the other impact responsive switch 11 is closed at a time later than a fixed time after closure of the impact responsive switch 10, the safety device 17 is not triggered. However, in this case, the pilot lamp 34 is lighted, indicating that the motor vehicle collides with another vehicle or a structure in the path of advance at such a low-speed that there is no need to initiate the safety device into action. The pilot lamp 34 goes out when the impact sensor is reset by pushing the push button switches 25 and 33.

In FIG. 4, there is shown another embodiment of the impact sensor of this invention which includes a constant voltage diode 40 and a high-speed relay 41.

As shown, the constant voltage diode 40 is connected at its cathode to a point between a resistor 26' and grounded capacitor 27' and at its anode to the gate of a thyristor 29' through a resistor 42. The anode of the constant voltage diode 40 is also grounded through a resistor 43. In this embodiment, a pilot lamp 34' is connected between a push button switch 33' and a ground line 24' and a coil 44 of the high-speed relay 41 is connected in parallel with a pilot lamp 34'. A relay switch 45 is interposed in a line 46 connecting the cathode of a thyristor 36' and a safety device 17', so as to disconnect the safety device 17' from the impact sensor in response to energization of the high-speed relay 41. The thyristor 36' has its anode connected to a bus line 20' and its gate connected to an impact responsive switch 11' through the resistor 35'. The impact responsive switch 11' is connected through a line 37' to the cathode of a thyristor 22'.

In the operation of the circuit shown in FIG. 4, closure of an impact responsive switch 10' renders a thyristor 22' conductive. Under this condition, if the other impact responsive switch 11' is closed by a pressure exerted thereon by the bumper 12, the thyristor 36' is rendered conductive, so that the safety device 17' is initiated into action.

Upon conduction of the thyristor 22', the capacitor 27' starts charging, and the constant voltage diode 40 is rendered conductive when the voltage across the capacitor 27' increases to its breakdown level a fixed time after conduction of the thyristor 22'. Conduction of the constant voltage diode 40 causes conduction of the thyristor 29', so that the pilot lamp 34' is lighted and simultaneously the high-speed relay 41 is energized. With the high-speed relay 41 energized, the relay switch 45 is opened to disconnect the safety device 17' from the thyristor 36'. Under this condition, even if the other impact responsive switch 11' is closed, the thyristor 36' is not rendered conductive, so that the safety device 17' is not triggered.

Thus, with this arrangement, it will be appreciated that the safety device is not triggered in case of a collision during travelling at such a low speed that there is little possibility of the vehicle occupants being injured.

As has been described above, this invention provides an improved impact sensor that is capable of sensing the speed of the motor vehicle at which speed at the moment of collision the safety device is to be triggered, thereby providing increased reliability of operation of the safety device.

We claim:

1. A motor vehicle safety device for protecting vehicle occupants from injuries resulting from a collision of a motor vehicle, the improvement comprising an impact sensor comprising:

1. a first impact responsive switch means fixedly mounted on the outside surface of a vehicle bumper so as to extend along the same and adapted to be closed by an impact exerted thereon at the time of a collision to produce a first closed switch signal;

2. a second impact responsive switch means fixedly mounted on the surface of a vehicle body behind said first switch means and adapted to be closed at a time after closure of said first switch means to produce a second closed switch signal, said time of closure of said second switch means being dependent upon the vehicle speed at the moment of a collision;

3. an actuator electrically connected to said first and second switch means and the safety device for triggering the safety device in response to said second closed switch signal from said second switch means; and 4. an electronic circuitry including a time delay circuit means connected to said first and second switch means and said actuator for delaying said first closed switch signal for a fixed delay time to produce a delayed output signal which is supplied to said actuator to render it inoperative, said electronic circuitry controlling said actuator in such a manner that said actuator is initiated only when said second switch means is closed at a time prior to the production of said delayed output signal, whereby the safety device is triggered by said actuator.

2. A motor vehicle safety device according to claim 1, in which each of said first and second impact responsive switch means comprises two ribbon-like contacts facing each other.

3. A motor vehicle safety device according to claim 1, in which said fixed delay time associated with said time delay circuit means is derived from the following equation:

$$t = l/V$$

wherein $t$ represents said fixed delay time, $l$ the distance between said first and second switch means and $V$ the vehicle speed above which there is a great possibility of the vehicle occupants being injured in a collision.

* * * * *